(No Model.)
R. G. LEHMAN.
HORSE COLLAR.
No. 564,089.  Patented July 14, 1896.
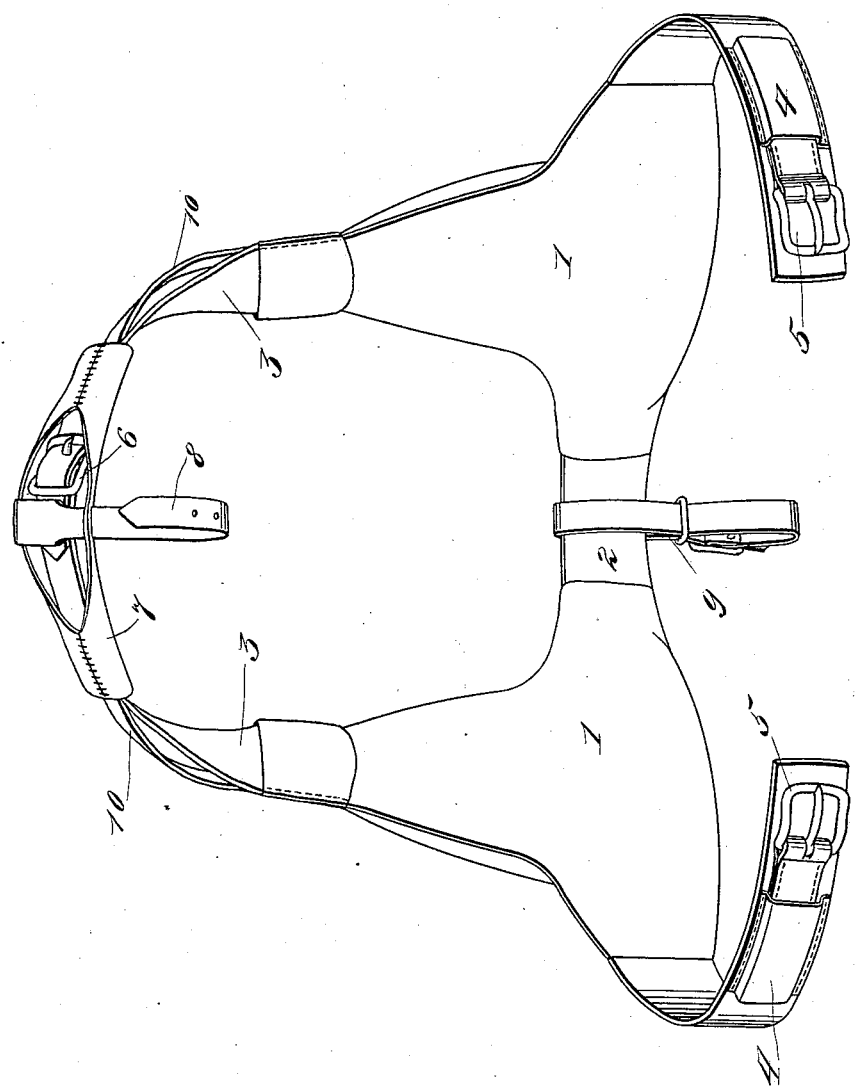
WITNESSES:
Edward Thorpe.
INVENTOR
R. G. Lehman
BY
Munn & Co
ATTORNEYS.

UNITED STATES PATENT OFFICE.

RICHEY GOOD LEHMAN, OF SAN DIEGO, CALIFORNIA.

HORSE-COLLAR.

SPECIFICATION forming part of Letters Patent No. 564,089, dated July 14, 1896.

Application filed September 7, 1895. Serial No. 561,731. (No model.)

*To all whom it may concern:*

Be it known that I, RICHEY GOOD LEHMAN, of San Diego, in the county of San Diego and State of California, have invented a new and Improved Horse-Collar, of which the following is a full, clear, and exact description.

This invention relates to certain improvements in horse-collars, and especially to that class of horse-collars commonly known as "breast-strap" or "breast collars;" and the object of the invention is to provide a device of this character, of a simple and improved form, which shall be adapted for heavy as well as light work, and one which shall be at once light, ornamental, and easy upon the breast and shoulders of the horse when in use.

The invention contemplates certain novel features of construction and combinations and arrangements of parts, whereby certain important advantages are attained and the device is made better adapted for use than other breast-collars heretofore devised, all as will be hereinafter fully set forth.

The novel features of the invention will be carefully defined in the claims.

In order that my improvements may be the better understood, I have illustrated in the accompanying drawing a breast-collar constructed in accordance with my invention, in which drawing the collar is represented as being composed of triangular side portions 1 1, connected by a breast-strap 2, and each having an upwardly-extending portion 3 and a rearwardly-extending portion 4.

The rearwardly-extending straps or portions 4 are provided with buckles or equivalent devices 5, adapted for attachment to the traces, and one of the upwardly-extending portions 3 is provided with a buckle 6, arranged to receive the other similar portion 3, whereby the collar is supported in place, said buckle being provided with a shield 7, arranged to underlie it so as to prevent chafing, and said shield being provided with a back-strap 8, arranged to extend rearwardly into position to be connected to the saddle.

The breast-strap 2 is provided with a short loop 9, adapted for attachment to the martingale, and the upwardly-extending portions 3 3 are formed in two separate plies, each outer ply 10 being spaced away from the corresponding inner ply to form a loop to receive and guide the reins. This construction dispenses with the employment of rings to guide the reins, and said loops are formed by the upwardly-extending portions 3 without the additional expense of providing the ordinary loops or rings.

The breast-strap 2 is flexible, and the whole device is by preference composed of harness-leather, the triangular portions 1 1 being stuffed or padded, so as to press evenly on the shoulders of the horse when the device is used for heavy draft purposes, and being arranged to fall away from the shoulders when the horse is standing still.

The device is so constructed that the breast-strap 2 presses but lightly on the breast of the horse, no matter how heavy the draft may be, the central portion of said strap being held away from the breast of the horse by means of the padded or stuffed triangular portions 1 1, whereby the work of the horse is greatly lightened and his endurance much increased, and, by reason of the collar being constructed to fall away from the shoulders and breast of the horse when standing, free circulation of air beneath the collar is permitted, so that chafing and galling is prevented.

Moreover the device is of extreme lightness, so that it bears with but little weight on the horse, except when under draft, and the collar is of a very ornamental and attractive appearance, and may be used in connection with any style of harness.

The construction of the collar as above described is extremely simple and inexpensive and is applicable for either light or heavy work and serves all the purposes of collar and hames for holding back or backing, this being accomplished by the breeching attachment and strap from the girth to the center of the breast.

For double teams this collar is equally advantageous, being made of suitable strength and heavy and strong across the breast, so a strong strap may be placed around the breast-strap and thence to the neck-yoke. The collar will also be provided with securely-attached staples and rings at its sides for connection with the neck-yoke or breast chains or straps. When used for very heavy draft purposes, the collar will usually be provided with a metal brace securely fastened in it outside the padding and extending from a point above the trace-tugs across the breast. Such braces will be of oval form of sufficient strength to prevent the collar from spreading or drawing back on the shoulders under heavy draft.

Having thus described my invention, I claim as new and desire to secure by Letters Patent—

1. A breast-collar, comprising two approximately triangular side portions connected together across the breast by a flexible connection and having their rear opposite sides provided with means for attachment to the traces, the said side portions having upwardly-extending portions connected together across the neck, the said upwardly-extending portions being each formed in two plies separated to form loops for the passage of the reins, the said side portions being stuffed and arranged to bear on the shoulders of the animal, whereby the connection between the side portions at the front is held away from the breast of the animal, substantially as set forth.

2. A breast-collar, comprising stuffed side portions connected together across the breast and having their rear opposite sides provided with means for attachment to the traces, the said side portions being further provided with upwardly-extending portions one of which is provided with a buckle, whereby the said portions are connected together across the neck, and a shield adapted to underlie the said buckle and provided with a rearwardly-extending back-strap adapted to be connected with the saddle, substantially as set forth.

RICHEY GOOD LEHMAN.

Witnesses:
ARIEL C. JONES,
GEORGE W. BOWLER.